Figure 1:
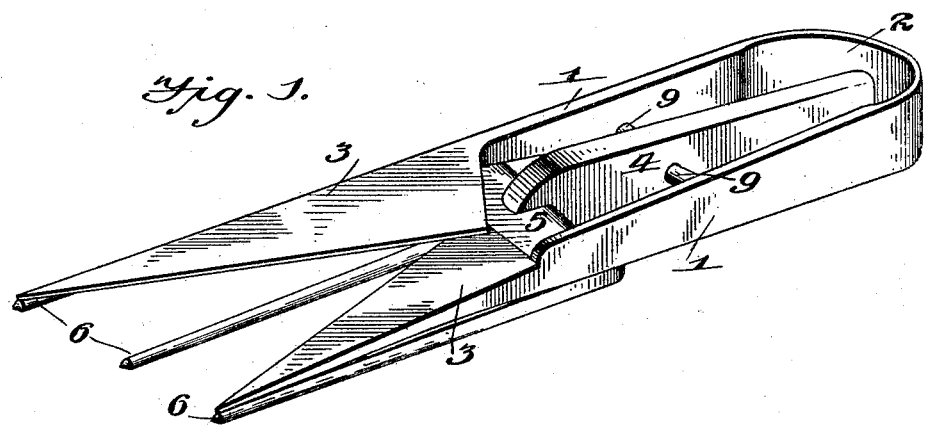

(No Model.)

H. B. BURKE.
SHEEP SHEARS.

No. 604,821. Patented May 31, 1898.

Witnesses
C. E. Hunt
Victor J. Evan

Inventor
Horace B. Burke,
By John Wedderburn
Attorney

UNITED STATES PATENT OFFICE.

HORACE B. BURKE, OF FORT PIERCE, FLORIDA.

SHEEP-SHEARS.

SPECIFICATION forming part of Letters Patent No. 604,821, dated May 31, 1898.

Application filed July 12, 1897. Serial No. 644,236. (No model.)

*To all whom it may concern:*

Be it known that I, HORACE B. BURKE, of Fort Pierce, in the county of Brevard and State of Florida, have invented certain new and useful Improvements in Sheep-Shears; and I do hereby declare the following to be a full, clear, and exact description of the invention, such as will enable others skilled in the art to which it appertains to make and use the same.

This invention relates to improvements in sheep-shears, the object of the same being to provide a guard or safety attachment which will facilitate the operation of removing or clipping wool and effectually prevent cutting into the skin of the animal.

The invention consists in certain novel features and details of construction and arrangement of parts, as hereinafter fully described, illustrated in the drawings, and incorporated in the claim.

Figure 2:
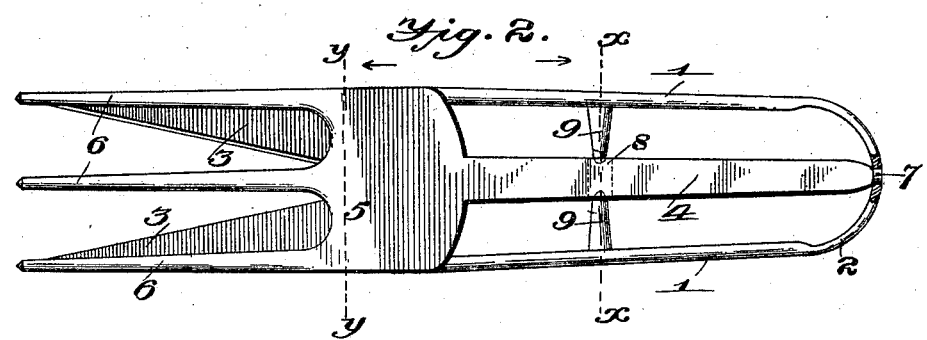
Figure 3:
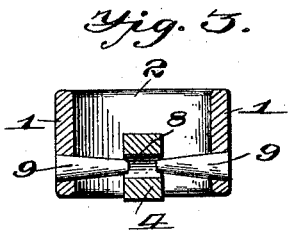
Figure 4:
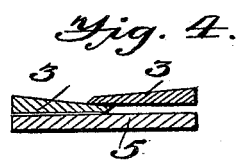

In the accompanying drawings, which form a part of this specification and in which like numerals of reference refer to similar parts throughout the several views, Figure 1 is a perspective view of a pair of sheep-shears with my improved attachment applied. Fig. 2 is an inverted plan view. Fig. 3 is a transverse sectional view on the line $x\ x$ of Fig. 2. Fig. 4 is a similar view on the line $y\ y$ of Fig. 2.

Referring more particularly to the drawings, 1 1 designate the handle portions of the shears, which are preferably constructed of metal and are connected to each other by a U-shaped portion 2, the outer ends of the handles having attached cutting-blades 3 3 of the configuration usually employed in this connection.

4 designates a shank, to the forward end of which is rigidly secured a plate 5, from which extend forwardly a series of rigid parallel teeth 6. The rear end of the shank is provided with a projecting pin 7, that is passed through an aperture therefor in the spring portion of the shears and made fast, while an intermediate portion of the shank has a transverse opening 8, with which engage inwardly-projecting pins 9 9, extending from the handle portions of said shears. The transverse opening and location of the pins which engage therewith are such as to position the teeth immediately below the lower blades of the shears, and it will be observed that the inner ends of said blades are adapted to travel over the plate 5. The pins serve to guide and steady the cutting-blades with relation to the teeth.

From the foregoing description, in connection with the accompanying drawings, it will be apparent that I furnish an implement for shearing sheep that is simple and cheap in construction and will provide for more quickly and effectually clipping the wool without injuring the skin of the animal.

Having thus described my invention, what I claim as new, and desire to secure by Letters Patent, is—

The combination with a pair of shears comprising blades with attached handles connected by a flat spring-like portion bent in semicircular form, and provided about centrally with an opening, of a shank provided at its rear end with a projecting pin fast in said opening, said shank having a transverse opening at an intermediate point and provided at its forward end with a series of rigid parallel teeth, and inwardly-projecting pins on the handle portions of the shears slidingly fitting in the opening of said shank, substantially as described.

In testimony whereof I have signed this specification in the presence of two subscribing witnesses.

HORACE B. BURKE.

Witnesses:
J. C. MICHAEL,
E. VAN HOOD.